March 21, 1939. W. HIRCHE Re. 21,033

REFRIGERATOR

Original Filed May 2, 1932 2 Sheets-Sheet 1

Inventor:
Willy Hirche
by [illegible]
Attorney

March 21, 1939. W. HIRCHE Re. 21,033
REFRIGERATOR
Original Filed May 2, 1932 2 Sheets-Sheet 2
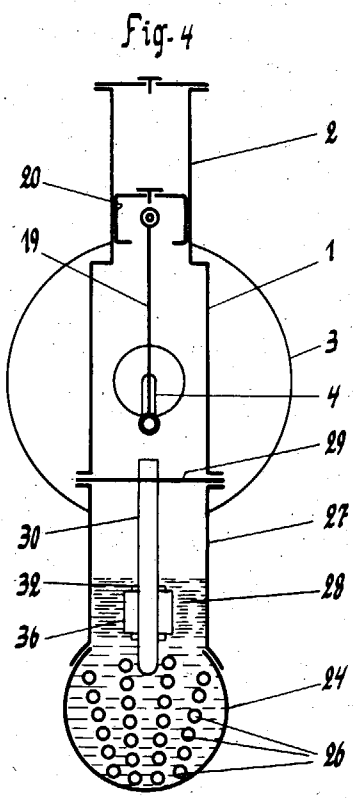
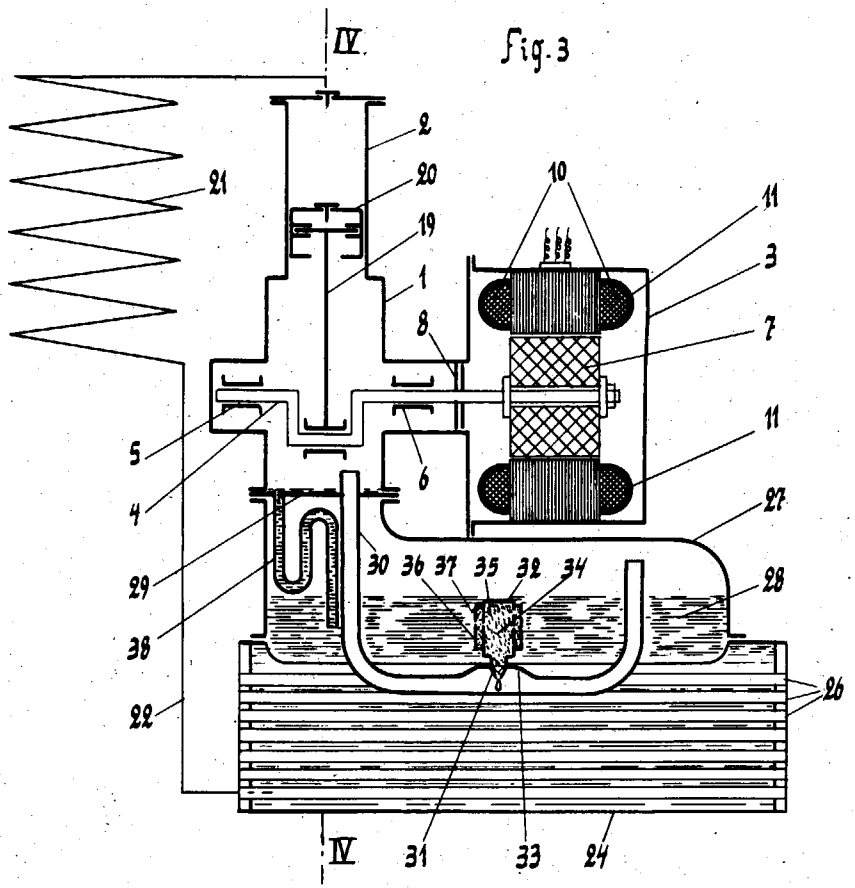
Inventor:
Willy Hirche
by [illegible]
Atty.

Reissued Mar. 21, 1939

Re. 21,033

UNITED STATES PATENT OFFICE 21,033

REFRIGERATOR

Willy Hirche, Leopoldshain, near Gorlitz, Germany, assignor, by mesne assignments, to E. Rothenberg, Berlin, Germany Original No. 2,016,637, dated October 8, 1935, Serial No. 608,750, May 2, 1932. Application for reissue October 1, 1937, Serial No. 166,859. In Germany January 2, 1930

18 Claims. (Cl. 62—115)

This invention relates to a refrigerator of the type in which as refrigerating medium a liquid is employed which does not combine with the lubricant but separates therefrom. The invention relates chiefly to a refrigerating liquid which is heavier than lubricating oil so that the oil consequently floats on it. An inconvenience connected with refrigerators in which pure oil is employed for the lubrication of the elements of compressor mechanism consists in that the oil which has to come into touch with the mechanism or the oil which has been carried off by the refrigerating vapors cannot return into the oil collecting compartment proper without special auxiliary means, so that the circulation of the oil is not continuous. Several collecting points for the oil are formed in the refrigerator, from which points the oil must be returned by pumps or other suitable auxiliary means to the oil collecting point proper. Apart from the fact that such a method is complicated, there is no guarantee for a regular and uniform lubrication. Such refrigerators require careful observation which is not compatible with the peculiarity of their purpose of use. Refrigerators must not be delicate and must require little attention. Once such a machine has been taken into service, it must continue to work for a long period without observation, this being only possible if the lubricating oil is automatically, uniformly and continuously circulated through the plant and has no opportunity of collecting in large quantities anywhere except in the oil collecting chamber proper.

The refrigerator according to the invention is of such a machine type which comprises only one main oil collecting compartment, the lubricating oil returning always automatically to the main collecting point after it has fulfilled its duty. Care is taken that the quantity of lubricating oil which is fed to the gearing elements is adapted to the requirements.

It is thus an object of the invention to provide a refrigerator in which a refrigerant medium and a lubricant are employed which medium and lubricant do not mix with each other and the refrigerant in its liquid state is heavier than the lubricant which may therefore float thereon, in which a container is provided containing refrigerant in the liquid state and lubricant floating on the surface of said refrigerant liquid together with means for transferring the lubricant to the mechanism of the refrigerator requiring lubrication and for returning the lubricant from said mechanism to said container.

Several embodiments of the invention are illustrated by way of example in the accompanying drawings in which:

Fig. 3 is a longitudinal section of a third form of construction.

Fig. 4 is a section on line IV—IV of Fig. 3.

Figure 2:
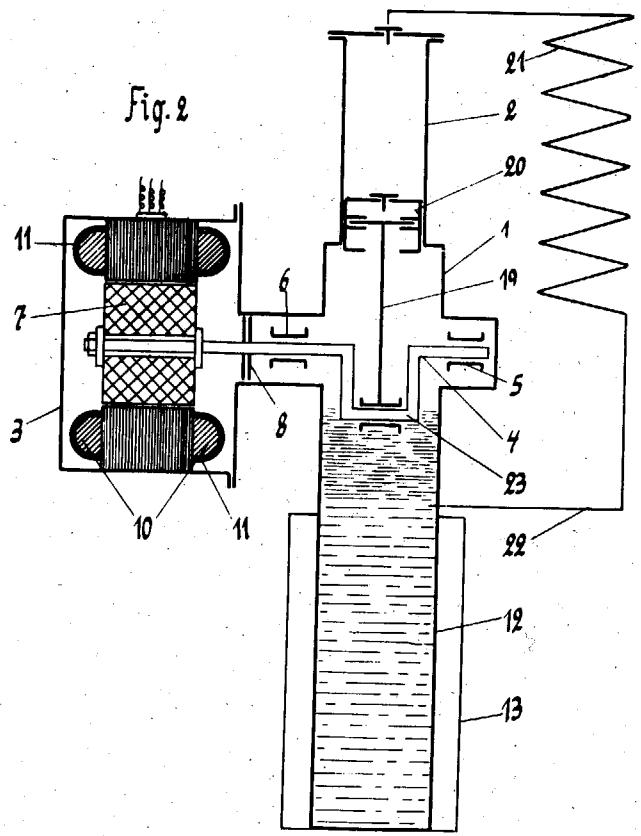
Fig. 2 is a similar view of a modified form of construction.
Figure 1:
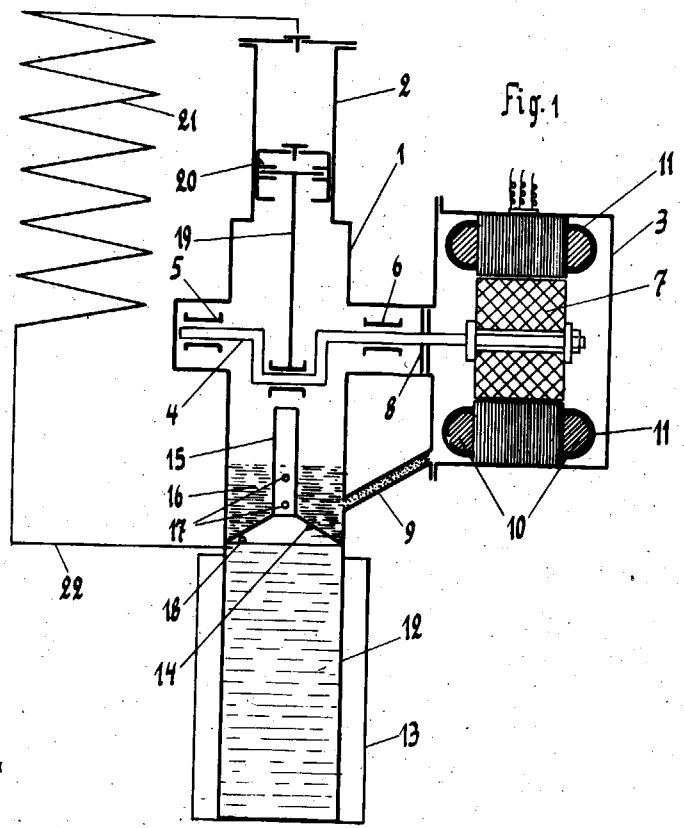
Fig. 1 shows diagrammatically a form of construction in section.

In all the forms of construction shown on the drawings a compressor cylinder 2 and a casing 3 of the driving motor are gas-tightly connected to a crank case 1. A crankshaft 4 is journaled at 5 and 6 in the crank case 1 and directly coupled to the rotor 7 of the driving motor. The shaft 4 is not journaled in the motor casing 3 but carries the motor on its overhanging end. The result is that the oil or other lubricant is prevented from entering the casing 3 which is tightly closed for this purpose by a packing 8. The casing 3 can be removed from the crank case 1 in order to render the motor accessible for repairs or exchanging. When the casing 3 is removed, the crank case 1 is not open to the atmosphere, being still closed by the packing 8. The inner space of the casing 3 is connected to the inner space of the crank case 1 by a tube 9 but this tube is filled with a fine granular substance and acting like a filter, so that, even when the casing 3 is removed, only very small quantities of gases or liquid can escape. The object of the tube 9 is, to establish a connection between the motor casing 3 and the crank case 1 which is only slightly permeable to gas but allows an equalization of pressure between the casing and the crank case. This filter tube 9 becomes operative only when the plant is evacuated in order to remove particularly all air and moisture from the motor casing which would have a destructive effect on the motor winding. In the case of suction effect being exerted for a sufficiently long period, all air and moisture will be removed from the motor casing. It is advisable, when the plant is working, to supply refrigerating medium gas to the air in the interior of the casing 3 considerably rarefied by exhaustion in order to produce a medium which conducts to the casing the heat developing in the motor winding. This feeding of the refrigerating medium gases into the casing 3 is effected through the filter tube 9. If, in spite of all packing means, oil should deposit in the motor casing, it can trickle back into the crank case 1 through the tube 9. The oil passing with the refrigerating medium vapors into the motor casing mixes with the fine metal particles which have become detached from the parts of the motor subjected to friction and thus forms a good conductor for the electric current. The polluted oil soon penetrates to the winding of the motor and the metal particles cause a shorting between the windings of the stator winding. If it is desired to prevent this by multiple insulating of the winding, very cumbersome dimensions of the stator result and the danger still exists that at sharp transition points the insulation will become so damaged by mechanical actions that it no longer works perfectly. A covering of the heads of the winding of the stator with a sheet metal hood certainly protects the winding against the penetration of oil but it prevents evacuating of the air and moisture from the enclosed space, this evacuating being however absolutely necessary in order to protect the insulation and the winding against destruction and to thus prevent any shorting in the winding. According to the invention the heads 10 of the winding of the stator are covered with a hood 11 of filter cloth or some other suitable fabric which prevents the metal particles mixed with the oil from penetrating to the insulation of the winding, but allows the evacuation of air from the winding enclosed by the hood.

The lower portion of the crank case 1 merges into an evaporator 12 or is detachably connected thereto. Cooling ribs 13 project in outward direction from the evaporator. At the point of transition between the crank case 1 and the evaporator 12 a hood 14 is arranged which separates the two compartments and has at its centre a rising pipe 15. The evaporator contains the refrigerating medium liquid, for example sulphur dioxide. An oil collector 16 is provided at the lower portion of the crank case 1. The gases forming in the evaporator pass through the hood 14 and the pipe 15 above the oil level in the crank case. The speed of travel of the gases increases in the pipe 15 so that small quantities of oil are sucked in by the gases out of the oil compartment through small holes 17 in the wall of the pipe 15 and fed to the operating mechanism parts. The oil dripping from these parts drops back directly into the oil collecting compartment. Any refrigerating medium which condenses in the crank case collects in the lower part of the crank case 1 as it is heavier than oil and passes through a small aperture 18 at the base of the hood back into the evaporator. The gases passing through the pipe 15 into the crank case are forced into a condenser 21 by a piston 20 connected by a piston rod 19 to the crank shaft 4. The gases condense in the condenser 21 and return in liquid state through a conduit 22 into the evaporator. The oil particles carried into the condenser return along the same path into the evaporator, where they float on the surface of the liquid refrigerating medium and, when the level of the liquid has sufficiently risen, pass through the hole 18 into the oil collecting compartment.

In the form of construction shown in Fig. 2 the crank case 1 merges directly into the evaporator so that no partition exists between the two. The oil also floats on the liquid refrigerating medium in the evaporator and the level of the oil is so high, that the crank 23 when in its extreme lower position dips into the oil. Thus, when the refrigerator is working, the oil, flung about in the casing by the crank thus reaches all mechanism parts. Instead of allowing the crank to dip into the oil, it is possible to bring the oil level close to the crank in its lowermost position and to arrange lubricating chains, rings or the like on the crank shaft which dip into the oil and feed it to the mechanism parts. Other feeding means may however be provided to bring the oil into contact with the gear parts. The oil dripping off drops directly into the oil collecting compartment. The ascending gases pass through the oil layer, take up oil particles and convey them to the mechanism parts. The refrigerating medium, condensing in the crank case, being heavier than oil, sinks through the oil layer and flows back into the evaporator.

In the form of construction illustrated in Figs. 3 and 4 a boiler-like evaporator 24 is connected to the crank case and tubes 26 extend through this evaporator 24. The evaporator 24 has a dome-like superstructure 27 which extends almost the entire length of the evaporator. The evaporator wall is open along the length and width of the dome 27 so that the gases rising in the evaporator can flow along the shortest path and collect in the upper portion of the dome. In order to facilitate the rising of the gases, the tubes are preferably so arranged that their distance apart in the horizontal direction continually increases in the superposed rows. The upper portion of the evaporator 24 and the lower portion of the dome 27 form an oil collecting compartment 28. Between the crank case 1 and the evaporator 24 a partition 29 extends so that the gases are conducted through a pipe 30 into the crank case, the other end of the pipe 30 being located in the gas space of the dome. The pipe 30 is of U-shape and its middle portion extends below the oil layer through the evaporator. To the lowest point of this suction pipe 30 a tube 31 of a filter 32 is connected like a nozzle, the pipe 30 being widened at the point of connection 33. The filter is filled with a fine granular substance 34 which allows the oil to pass through only in drops and has in its upper portion, extending into the stored oil, holes 35 for the passage of the oil. The filter is surrounded by a casing 36 forming an annular space with the filter 32 which space is also filled with a suitable filtering substance. Lateral holes 37 in the upper portion of the casing 36 allow oil to pass therein.

By choosing a suitable substance for filling the filter the quantity of oil passing therethrough can be adapted to the quantity of oil required. The oil drips through the tube 31 into the suction pipe 30 at its widened portion 33. Owing to the widened cross section of the pipe 30 the speed of the gas sucked by the compressor is reduced to such an extent at this point that the gas can not exert any suction effect on the oil. Consequently, the oil drips freely and is only carried off by the gases when it arrives in the narrower portion of the suction pipe. Thus, the gas can never carry off more oil than drips from the filter. If necessary, the quantity of oil flowing through the filter can be regulated. It is evident, that some other suitable throttling elements may be fitted instead of the filter illustrated. The oil dripping from the mechanism parts collects in the lower portion of the crank case and passes into a pipe 38 extending through the bottom of the crank case and terminating above the partition 29. This pipe 38 is constructed like a siphon, and its lower end dips into the lubricating oil. When the lower bend and the rising arm of the pipe 38 is filled with oil the oil passes through the upper bend into the downwardly directed arm, the siphon then becomes operative and sucks the oil out of the crank case which is thus suddenly emptied. This emptying always takes place automatically at intervals dependent upon the quantity of oil collecting in the crank case. Consequently, the oil level in the evaporator is regulated automatically and is thus maintained at a constant height. Instead of the siphon pipe a straight pipe might be employed, the upper end of which terminates above the partition 29 in the crank case and the lower end of which terminates in the oil space of the evaporator. The effect however would then not be as perfect, as that of the siphon pipe. The oil in this case would only flow in the pipe by gravity, the flowing taking place only when so much oil has collected above the pipe that the pressure on the oil column is greater than the counterpressure caused by the pressure in the evaporator and by the vacuum in the crank case.

In the construction illustrated in Figs. 3 and 4 the evaporator need not be connected directly to the crank case, as the same effect would take place if the two parts are spatially separated and interconnected by the pipes 30 and 38. The construction according to Figs. 3 and 4 is not restricted to the employment of a liquid refrigerating medium which is heavier than lubricating oil, it operates equally advantageously if the liquid refrigerating medium floats on the lubricating oil, only the filter 32 must be arranged in the oil compartment.

The especially large oil space in conjunction with the regulated quantity of lubricating oil fed to the mechanism parts and the automatic returning of the lubricating oil to the collecting chamber ensure a permanently reliable circulation of the oil and a constant oil level.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. A refrigerator in which as refrigerating medium a liquid is employed which does not combine with the lubricating oil, comprising in combination a crank case, an oil collecting chamber below and communicating with said crank case, an evaporator under said crank case and separated from said crank case by said oil chamber, a compressor connected to said crank case, and a pipe extending through said oil chamber having small feed apertures adapted to accelerate the passage speed of the gases sucked from said evaporator by said compressor to cause the gases to draw oil through the holes in said pipe and convey the same into said crank case.

2. A refrigerator in which as refrigerating medium a liquid is employed which does not combine with lubricating oil, comprising in combination a crank case, an evaporator on the lower end of and communicating with said crank case, a condenser on the upper end of said crank case, and an ejection conduit adapted to convey the condensed refrigerating medium from said condenser to said evaporator and terminating in said evaporator approximately at the line of transition between the refrigerating medium and the oil floating thereon.

3. A refrigerator in which as refrigerating medium a liquid is employed which does not combine with lubricating oil, comprising in combination a crank case, an oil collecting chamber below and communicating with said crank case, an evaporator under said chamber, a hood on said evaporator separating the same from said box and having an aperture near its lower edge for the return of condensed refrigerating medium from said crank case to said evaporator, and a pipe rising from said hood forming with said hood and the lower portion of said crank case an oil collecting chamber.

4. A refrigerator in which as refrigerating medium a liquid is employed which does not combine with lubricating oil, comprising in combination a crank case, a crank shaft journalled in and projecting from said crank case, an overhanging rotor mounted on the free end of said crank shaft, a stator surrounding said rotor, a casing enclosing said rotor and carrying said stator detachably connected to said crank case adapted to give access to said rotor and said stator, and a packing between said crank case and said casing adapted to prevent oil from passing from said crank case into said casing.

5. A refrigerator in which as refrigerating medium a liquid is employed which does not combine with lubricating oil, comprising in combination a crank case, a motor casing on said crank case, means for preventing the penetration of oil but allowing a limited penetration of refrigerating medium gases from said crank case into said motor casing.

6. A refrigerator in which as refrigerating medium a liquid is employed which does not combine with lubricating oil, comprising in combination a crank case, an evaporator under said crank case, a motor casing on said crank case, a packing between said crank case and said motor casing adapted to prevent oil from passing, but to allow the restricted passage of gases from said crank case to said motor casing, and a filter like connection between said motor casing and said evaporator adapted to allow a throttled passage of refrigerating medium gases to pass to said motor casing and in conjunction with said packing to allow a circulation of gases through said motor casing.

7. A refrigerator in which as refrigerating medium a liquid is employed which does not combine with lubricating oil, comprising in combination a crank case, a motor casing on said crank case, and adjustable means between said crank case and said motor casing adapted to regulate the passage of gas through said motor casing.

8. A refrigerator in which as refrigerating medium a liquid is employed which does not combine with lubricating oil, comprising in combination a crank case, a motor casing on said crank case, a stator winding in said casing, a hood of filter cloth on said stator winding adapted to allow the evacuation of air from said winding but preventing the penetration of metal particles on to said winding.

9. A refrigerator in which as refrigerating medium a liquid is employed which does not combine with lubricating oil, comprising in combination a crank case, a crank shaft journalled in said crank case on said evaporator extending from said crank case forming at the same time the oil collecting chamber, the level of the pure lubricating oil floating on but not mixed with the liquid refrigerating medium in said evaporator extending up to the crank of said crank shaft which crank dips into and distributes the oil to said crank parts.

10. A refrigerator in which as refrigerating medium a liquid is employed which does not combine with lubricating oil, comprising in combination a crank case, an oil chamber below and communicating with said crank case, an evaporator below said oil chamber, a suction pipe between said crank case and said evaporator extending through said oil chamber adapted to conduct the refrigerating gases from said evaporator to said crank case, a throttle element fitted in said suction pipe adapted to supply by gravity the necessary quantity of oil from said oil chamber to said suction pipe to be carried by the gases into said crank case.

11. A refrigerator in which as refrigerating medium a liquid is employed which does not combine with lubricating oil, comprising in combination a crank case, an oil chamber below and communicating with said crank case, an evaporator under said oil chamber, a suction pipe in said evaporator extending to above the level of oil in said oil chamber, and a filter in said oil chamber having lateral perforations at its upper end and communicating at its lower end with the interior of said pipe.

12. A refrigerator in which as refrigerating medium a liquid is employed which does not combine with lubricating oil, comprising in combination a crank case, an oil chamber below and communicating with said crank chamber, an evaporator below said oil chamber, a suction pipe in said evaporator extending to above the level of oil in said oil chamber, a filter in said oil chamber, and a widened portion of said pipe connected to said filter tube adapted to reduce the flow of gases from said evaporator at the point of connection with said filter tube to prevent suction effect being exerted on said filter tube.

13. A refrigerator in which as refrigerating medium a liquid is employed which does not combine with lubricating oil, comprising in combination with the crank case, an oil chamber below and communicating with said crank case, an evaporator containing said oil chamber, and a pipe connection between said crank case and said evaporator to conduct the oil collected in said crank case to said oil chamber, the upper end of said pipe terminating in said crank case and its lower end in said oil chamber.

14. A refrigerator in which as refrigerating medium a liquid is employed which does not combine with lubricating oil, comprising in combination with the crank case, an oil chamber below and communicating with said crank case, a siphon-like pipe between said crank case and said oil chamber adapted to exert a siphon-like effect on the oil collected in said crank case and to return this collected oil into said chamber.

15. A refrigerator in which as refrigerating medium a liquid is employed which does not combine with lubricating oil, comprising in combination an oil chamber, an evaporator below said oil chamber of boiler-like construction communicating with said oil chamber by perforations in its upper wall distributed over the entire length and width of said oil chamber, said oil chamber being made like a boiler dome and having a space for collecting the gases rising from said evaporator.

16. A refrigerator in which as refrigerating medium a liquid is employed which does not combine with lubricating oil, comprising in combination an oil chamber, an evaporator under said oil chamber of boiler like construction and tubes in said oil chamber for the circulation of the refrigerating medium arranged horizontally in several rows the spacing of the tubes in the different rows widening successively in each superposed row to facilitate the rising of the gas bubbles in said evaporator.

17. A refrigerator in which a refrigerating medium and a lubricant are employed, which refrigerant and lubricant do not mix with each other and the refrigerant in its liquid state is heavier than the lubricant, comprising compressor mechanism including an operating element therefor, an evaporator in which is present refrigerant in the liquid state and lubricant floating on said refrigerant liquid, said evaporator being in direct connection with the intake side of said compressor mechanism, means for transferring lubricant from said evaporator to lubricate the compressor mechanism and a passage for returning lubricant from said mechanism to said evaporator, the construction and arrangement being such that the said operating element of said compressor mechanism periodically dips into the lubricant stored in said evaporator.

18. A refrigerator in which a refrigerating medium and a lubricant are employed, which refrigerant and lubricant do not mix with each other and the refrigerant in its liquid state is heavier than the lubricant, comprising in combination with a compressor including a crank case within which means for operating the compressor is housed, an evaporator located immediately below the compressor operating mechanism and forming a continuation of the crank case, the upper portion of said evaporator forming a lubricant collecting chamber adjacent to and at a lower elevation than said compressor operating mechanism so that lubricant may drain from said compressor operating mechanism directly into said lubricant collecting chamber where it will float upon the liquid refrigerant in said evaporator, said lubricant collecting chamber being the sole lubricant collecting space in said refrigerator.

WILLY HIRCHE.